(12) United States Patent
Gaudet

(10) Patent No.: US 9,839,313 B1
(45) Date of Patent: Dec. 12, 2017

(54) INVERTED CONTAINER HOLDER WITH CONVEX-PROFILE FUNNEL

(71) Applicant: Joseph Aolden Gaudet, Richmond (CA)

(72) Inventor: Joseph Aolden Gaudet, Richmond (CA)

( * ) Notice: Subject to any disclaimer, the term of this patent is extended or adjusted under 35 U.S.C. 154(b) by 0 days.

(21) Appl. No.: 15/369,551

(22) Filed: Dec. 5, 2016

(51) Int. Cl.
| | | |
|---|---|---|
| *A47G 23/02* | (2006.01) | |
| *A47G 29/00* | (2006.01) | |
| *A47J 47/16* | (2006.01) | |
| *A47K 5/00* | (2006.01) | |
| *G06K 7/10* | (2006.01) | |

(52) U.S. Cl.
CPC ......... *A47G 29/00* (2013.01); *A47G 23/0241* (2013.01); *A47J 47/16* (2013.01); *A47K 5/00* (2013.01); *G06K 7/10366* (2013.01)

(58) Field of Classification Search
CPC .... A47G 29/00; A47G 23/0241; A47G 23/02; A47J 47/16; A47K 5/00; G06K 7/10366
USPC .......... 248/542, 311.3, 146, 148, 312, 312.1; 248/311.2; 222/108, 181.2, 181.3; 211/74
See application file for complete search history.

(56) References Cited

U.S. PATENT DOCUMENTS

| | | | | |
|---|---|---|---|---|
| 332,582 | A | | 12/1885 | Bernardin |
| 2,729,080 | A | * | 1/1956 | Bennett ............... A47G 23/0216 24/545 |
| 2,767,744 | A | * | 10/1956 | Beerman ................... B65B 3/04 141/319 |
| 2,988,333 | A | * | 6/1961 | Mesic ................ A47G 23/0241 165/169 |
| 3,090,478 | A | * | 5/1963 | Stanley ................... B65B 43/54 141/177 |
| 4,219,035 | A | * | 8/1980 | Deconinck ............... A47K 1/09 206/561 |
| 4,271,878 | A | | 6/1981 | Bologa |
| 4,548,348 | A | * | 10/1985 | Clements ........... A47G 23/0216 206/514 |
| 4,681,219 | A | * | 7/1987 | Kitchens ................ A01K 97/06 206/315.11 |
| 5,105,860 | A | | 5/1992 | Connor |
| 5,146,957 | A | * | 9/1992 | Belokin, Jr. ....... B65D 21/0233 141/1 |
| 5,149,041 | A | | 9/1992 | Hartke |
| 5,297,600 | A | | 3/1994 | Downes et al. |

(Continued)

OTHER PUBLICATIONS

Mybotto Portfolio. http://mybotto.com/ retrieved Dec. 5, 2016.

(Continued)

*Primary Examiner* — Nkeisha Smith

(57) ABSTRACT

A holder for inverted containers has a holder body with four vertical or near vertical outer walls and a guiding funnel passing through the holder body from top to bottom. A top surface of the holder body is cylindrically curved to support the shoulders of a container. At least one notch is present in the holder body for accommodating a handle of a container. All the surfaces have at least one linear or convex sectional profile and are pocketless so that dishwashing water drains off the holder in every orientation. The holder may include a back plate for additional support, magnetic connectors for connecting to other holders, or an electronic communication device for detecting a tag on a container. The holder may be made in two pieces that fasten together.

19 Claims, 4 Drawing Sheets

(56) References Cited

U.S. PATENT DOCUMENTS

| | | | |
|---|---|---|---|
| D386,084 S | 11/1997 | Marseglia | |
| 5,702,009 A | 12/1997 | Ouellet et al. | |
| 5,794,904 A * | 8/1998 | Hackley | A47G 23/0241 248/311.3 |
| 5,950,698 A * | 9/1999 | Cristea | B67C 9/00 141/364 |
| 5,975,342 A * | 11/1999 | Bradeen | B60N 3/103 217/65 |
| 6,050,468 A * | 4/2000 | Kelley | B60N 3/103 224/542 |
| 6,053,338 A * | 4/2000 | Avery | A46B 15/0055 211/184 |
| 6,109,581 A | 8/2000 | Kracke et al. | |
| 6,149,027 A * | 11/2000 | Rathjen | A47G 19/065 220/23.83 |
| 6,302,364 B1 * | 10/2001 | Chiueh | B60N 3/10 206/545 |
| 6,325,222 B1 * | 12/2001 | Avery | A46B 15/0055 211/184 |
| RE37,566 E | 3/2002 | Cristea et al. | |
| 6,382,579 B1 * | 5/2002 | Kenniston | B65D 35/56 248/108 |
| 6,481,685 B1 * | 11/2002 | Cormier | A47G 23/0241 248/309.1 |
| 6,581,804 B1 * | 6/2003 | Ciavarella | B65D 83/206 222/181.3 |
| 6,592,092 B2 | 7/2003 | Stahlberg | |
| 6,684,922 B1 | 2/2004 | Alston et al. | |
| 7,032,782 B1 * | 4/2006 | Ciavarella | B65D 83/206 222/181.3 |
| 7,415,996 B2 | 8/2008 | Favreau | |
| 7,556,230 B2 * | 7/2009 | Sarullo | A47G 23/0216 248/311.2 |
| 8,360,380 B2 * | 1/2013 | Soma | B60N 3/101 224/926 |
| 8,550,550 B2 * | 10/2013 | Cassese | A47G 19/06 220/23.8 |
| 8,607,831 B2 * | 12/2013 | Doglioni Majer | G07F 13/10 141/174 |
| 9,428,093 B2 * | 8/2016 | Kupina | B60N 3/108 |
| 2006/0255223 A1 * | 11/2006 | Gaudet | A47K 5/13 248/311.2 |
| 2006/0289712 A1 * | 12/2006 | Keyes | B44C 7/00 248/311.2 |
| 2007/0221804 A1 * | 9/2007 | Harshman | B60N 3/106 248/311.2 |
| 2009/0032657 A1 * | 2/2009 | Huang | A47G 23/0225 248/207 |
| 2009/0095865 A1 * | 4/2009 | Everhart | B60N 3/105 248/309.1 |
| 2016/0051951 A1 * | 2/2016 | Gorra | B28C 5/10 211/70.6 |

OTHER PUBLICATIONS

24 Modern Mugs and Creative Mug Designs. http://www.toxel.com/inspiration/2009/01/20/24-modern-mugs-and-creative-mug-designs/ retrieved Dec. 5, 2016.

Todd Pletcher Pottery—elevate your everyday. http://www.pletcherpottery.com/ retrieved Dec. 5, 2016.

Upside Down Bottle Holder. http://www.awesomeinventions.com/shop/upside-down-bottle-holder/ retrieved Dec. 5, 2016.

Compac Last Drop Bottle Stabilizer. https://www.amazon.com/Compac-Last-Drop-Bottle-Stabilizer/dp/B000IZWJBA/ref=pd_bxgy_79_img_2?ie=UTF8 &,refRID=07G5AY51BRG272X428VK retrieved Dec. 5, 2016.

Last Drop : Pumping Up Till the Last Drop From the Bottom of a Bottle. http://www.tuvie.com/last-drop-pumping-up-till-the-last-drop-from-the-bottom-of-a-bottle/ retrieved Dec. 5, 2016.

* cited by examiner

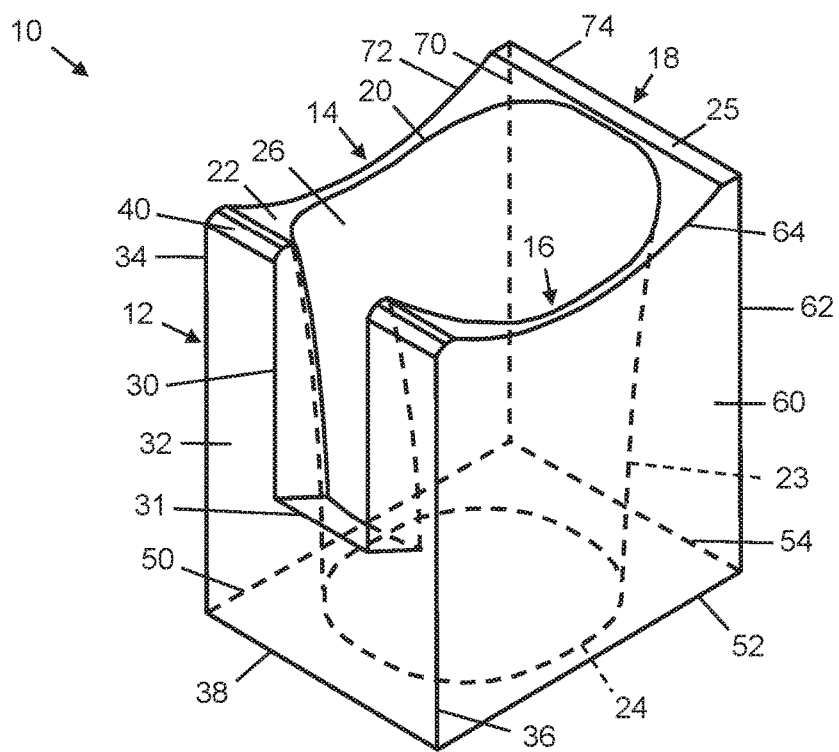
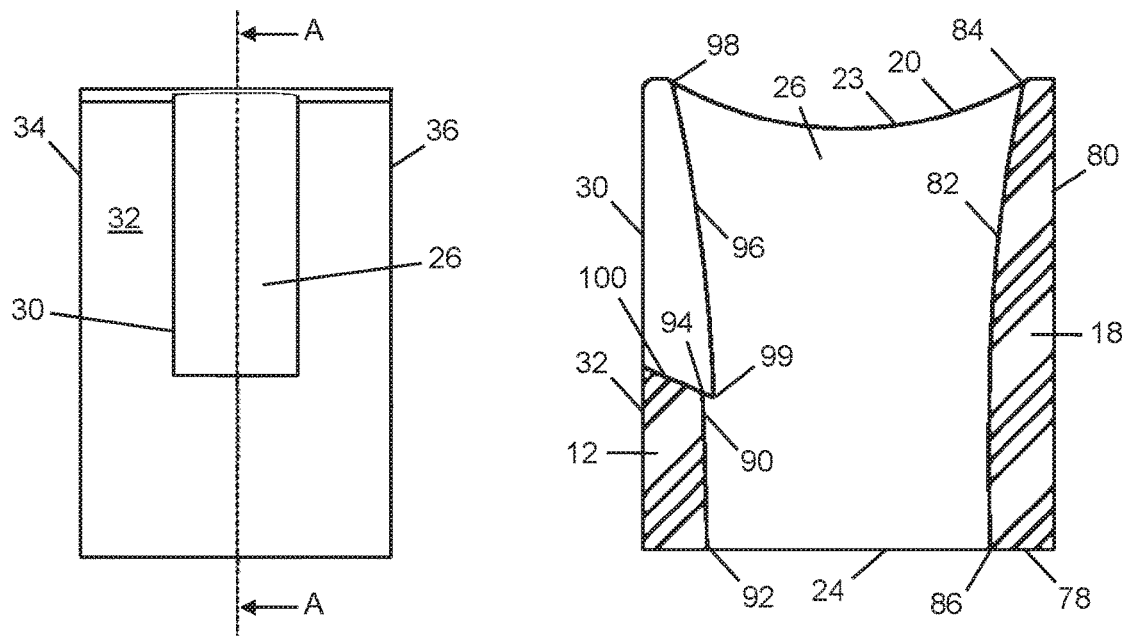
FIG. 1
FIG. 2
FIG. 3

INVERTED CONTAINER HOLDER WITH CONVEX-PROFILE FUNNEL

TECHNICAL FIELD

This application relates to a device for holding, in an inverted position, different sizes and shapes of bottles or containers containing fluids, particularly high viscosity fluids. More particularly, the device includes a convex-profile funnel for guiding the containers into the holder.

BACKGROUND

Ever since the introduction of viscous products sold in containers or bottles, consumers have been frustrated by the time and effort required to remove the last drop of product from the container. The desirability of draining the residue from near-empty bottles of ketchup, honey and other viscous liquids has long been recognized. Reasons for wanting to extract as much product as possible include reducing wastage, the absence of a newly purchased bottle or container of product, saving money, getting full product value (of a product) and the desire to facilitate rinsing of the container in preparation for recycling. Consistent with current environmental values, water would also be saved in the cleaning of recyclable bottles or containers.

Several bottle holders have been developed to facilitate extraction of the last remaining contents of containers from closed and inverted bottles so that the contents will be readily available when the bottle is opened again for use, and numerous designs for inverted bottle holders have been patented. For example, U.S. Pat. No. 4,271,878 to Bologna discloses a device with an upper portion having an opening for receiving the neck of a bottle with the bottle in an inverted position. Means are provided for supporting the device in stable equilibrium on a support surface with the upper portion of the device in an elevated position in which the bottle is held clear of the support surface so that a container can be placed below the mouth of the bottle. A plurality of fingers extend inwardly of the opening in the upper portion of the device and are arranged to engage the neck of the bottle. U.S. Pat. No. 5,105,860 to Connor describes an apparatus with three openings within a base having varying diameters, depths and shapes to accommodate containers of varying dimensions. U.S. Pat. No. 5,664,753 to Takei discloses a device designed to engage the cap of a bottle to hold the bottle or container in an inverted position. U.S. Pat. No. 5,924,659 to Babcock discloses an apparatus with a pair of grasping arms selectively adjustable to grasp and hold containers of various sizes and shapes in an inverted position. U.S. Pat. No. 6,109,581 to Kracke describes a holder with at least one side opening. U.S. Pat. No. 5,702,009 to Ouellet discloses a cube-shaped hollow body having a sidewall on each of five sides defining a cavity which is open at a sixth side. Several of the sidewalls have different sized apertures capable of holding the neck of particular sized bottles.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a device for holding in an inverted position different sizes and shapes of containers, such as tubes and bottles containing fluids, particularly viscous fluids such as ketchup, salad dressing, honey, mustard, barbecue sauce, motor oils, glues, shampoos, soaps, dishwashing liquids and many more. The holder includes a profiled funnel for guiding the containers into the holder. It may be a transportable, free-standing device that will easily fit on a refrigerator door shelf and rest on flat surfaces without toppling over when used. The surfaces of the holder are free from water traps or other features that cause puddling of, for example, dishwashing water.

The inverted container holder disclosed herein can be used and reused in many places. It saves time when extracting contents of the containers, it saves money expended on product that would otherwise be wasted, it reduces the likelihood of self-induced personal injury (e.g. hitting the ketchup bottle on one's hand too hard while trying to get the ketchup flowing), it facilitates the recycling of the material of the container and it reduces frustration of people of all ages, thereby enhancing consumer experience. The holder can be used with a great variety of different bottles while providing adequate stability within a compact footprint. Embodiments disclosed herein provide one or more of the advantages above.

Disclosed herein is a holder for an inverted container comprising: a front wall having a notch extending partially down the front wall from a middle region of a top edge of the front wall; two opposing side walls each connected at front edges thereof to a different side edge of the front wall; a back wall connected at different side edges thereof to back edges of the two side walls; a top surface formed by tops of the front, back and side walls, the top surface having a first aperture and a concave side profile and being concave in only one orthogonal direction; a bottom surface formed by bottoms of the front, back and side walls and having a second aperture that is smaller than the first aperture; and an inner surface connecting the first aperture to the second aperture and defining a guiding funnel inside the front, back and side walls, the inner surface having a convex profile.

BRIEF DESCRIPTION OF DRAWINGS

The following drawings illustrate embodiments of the invention, which should not be construed as restricting the scope of the invention in any way.

FIG. 1 is a perspective view of the holder for inverted containers, according to an embodiment of the present invention.

FIG. 2 is a front view of the holder of FIG. 1.

FIG. 3 is a right side sectional view of the holder taken along section A-A of FIG. 2.

DESCRIPTION

A. Glossary

Figure 4:
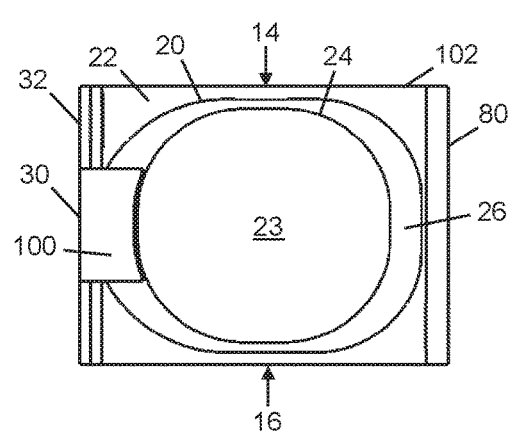
FIG. 4 is a top view of the holder of FIG. 1.

The terms "horizontal" and "vertical" when used with respect to the holder of the present invention are to be interpreted as if the holder were placed with its bottom surface on a horizontal surface.

The term "cylindrical" relates to a cylinder having its broadest mathematical meaning, i.e. a surface or part of a surface spanned by identical parallel lines.

The term "orthogonal" is used to refer to lines or directions that cross at right angles to each other. Two orthogonal lines can be traced on a surface, which may or may or may not be planar.

B. Exemplary Embodiment

Referring to FIGS. 1-7, there is shown an exemplary embodiment of an inverted container holder in accordance with the present invention. The holder is shown with an overall cuboid form holder body 10 having a front wall 12, a left wall 14, a right wall 16 and a back wall 18. An aperture 20 is present in the top surface 22 of the holder body 10. Another aperture 24 is present in the bottom surface of the holder body 10. An inner surface 26 in the holder body 10 forms a guiding funnel 23 that passes between the apertures 20, 24 and through the holder body 10. The upper aperture 20 is larger than the lower aperture 24. The top surface 22, particularly at the tops of the left and right walls 14, 16, is intended to support the shoulders of inverted bottles and is curved in order to increase the stability of support. A small flat, horizontal area 25 is present on the top surface, which may in other embodiments be replaced with a continuation of the curved portion of the top surface.

The inner surface 26 forming the guiding funnel 23 is concave in directions traced across the surface in a horizontal plane, when the holder body 10 is placed on a horizontal surface. The inner surface 26 of the guiding funnel 23 is convex along directions traced in a shortest path across the surface from points on one of the apertures 20, 24 to points on the other aperture, i.e. in up-down directions. More specifically, inner surface 26 does not have any portion that is concave in two orthogonal directions, i.e. it does not have dimples, closed-end troughs or basin-like areas in which water can puddle if the holder is placed in a dishwasher without thought to its orientation. In fact, all surfaces of the holder, whether taken individually or combined, are free from water traps, pockets or other features that would collect water or retain solids when the holder is washed in a dishwasher. Because of this, drain holes (other than guiding funnel 23) are not required in the holder, which would otherwise be susceptible to blocking and more difficult to clean.

Another reason to make the inner surface fully convex in the up-down direction, rather than concave or even partially concave, is to maximize the volume of material that can be used for the holder, in order to maximize its weight and hence its stability.

A notch 30 is present in a middle region of the front wall 12 of the holder body 10 and extends downwards to front edge 31 in the front face 32 of the holder. The notch 30 accommodates handles, when present, of some containers that are placed in an inverted orientation in the holder body 10.

The front face 32 is flat and vertical. The front face 32 extends from front, left edge 34, which is vertical, to a front, right edge 36, which is also vertical, and from a front, bottom edge 38 to a front, upper edge 40, which in this embodiment is rounded. The bottom face 78 (FIG. 3) of the holder is flat and extends from left, bottom edge 50 to right, bottom edge 52, and from front, bottom edge 38 to back, bottom edge 54. The right face 60 is flat and vertical, and extends from the front, right edge 36 to the back, right edge 62, which is vertical, and from the right, bottom edge 52 to the top, right edge 64. Similarly, the left face 102 (FIG. 4) is flat and vertical, and extends from the front, left edge 34 to the back, left edge 70, which is vertical, and from the left, bottom edge 50 to the top, left edge 72. The back face 80 (FIG. 3) is also flat and vertical, and extends between back, bottom edge 54, back left edge 70, back right edge 62 and top back edge 74.

Particularly, as the left and right faces 102, 60 are vertical, multiple holders can be positioned next to each other without any wastage of space. Also, by making the front and back surfaces 32, 80 vertical as well, the amount of material used within the available volume of the holder can be maximized in order to maximize the weight of the holder, without taking up any more surrounding space than is necessary. This also keeps the footprint of the holder to a minimum. The reason to maximize the weight is to be able to stably support containers that are full and may be top-heavy when inverted. This is of particular importance given the competing requirements of maximizing both the size of the guiding funnel 23 in order to accommodate as many differently sized bottles and containers as possible, and the available volume of material that can be used for the holder.

Containers such as bottles, tubes and cans may be placed in an inverted position in the holder, to rest freely therein, without needing to be clamped or otherwise held or otherwise restricted. The inverted containers may or may not have handles.

Referring to FIG. 2, the front of the holder is shown, showing the inner surface 26 of the guiding funnel 23, the notch 30 in the front face 32, and the front, left edge 34 and front right edge 36. Section A-A defines the view of FIG. 3, which shows the front wall 12, back wall 18, inner surface 26 of the guiding funnel connecting top aperture 20 to bottom aperture 24 and notch 30. Bottom face 78 and back face 80 of the holder are shown.

The convex nature of the inner surface 26, in an up-down direction on the inner surface, can be seen by line 82, which is a profile of the surface between a point 84 at the top aperture 20 and a point 86 at the bottom aperture 24. Similarly, the convex nature of the inner surface 26, in an up-down direction on the inner surface, can also be seen by line 90, which is a profile of the surface between a point 92 at the bottom aperture 24 and a point 94 at the inner bottom edge of the notch 30. The convex nature of the inner surface 26, in an up-down direction on the inner surface, can further be seen by line 96, which is a profile of the inner edge of the notch 30 between a point 98 at the top aperture 20 and a point 99 at the inner corner of the notch. As a result of extensive testing with approximately 200 different shapes of container, the inventor has found that the convex profile of the inner surface 26 improves the funneling of containers into the holder compared to a conical (or straight-profiled) funnel. This permits users to "throw-in" the containers with a little less care than would otherwise be required, for example if the inner surface 26 were conical or had a straight profile. The bottom surface 100 of the notch is flat and slopes inwards and downwards from the front face 32 towards the guiding funnel 23.

Referring to FIG. 4, the holder body 10 is shown from the top, showing the left wall 14, the right wall 16, the top aperture 20, the bottom aperture 24, the top surface 22, the inner surface 26 of the guiding funnel 23, the notch 30, the bottom surface 100 of the notch, the front face 32 and the back face 80. Additionally shown is the left surface 102.

Figure 5:
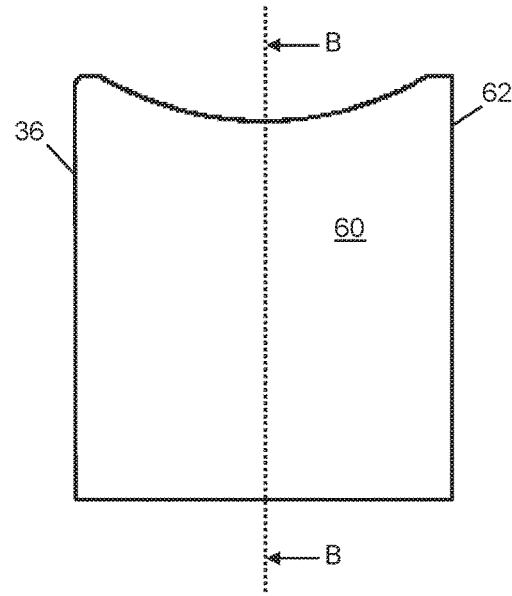
FIG. 5 is a right side view of the holder of FIG. 1.
Figure 6:
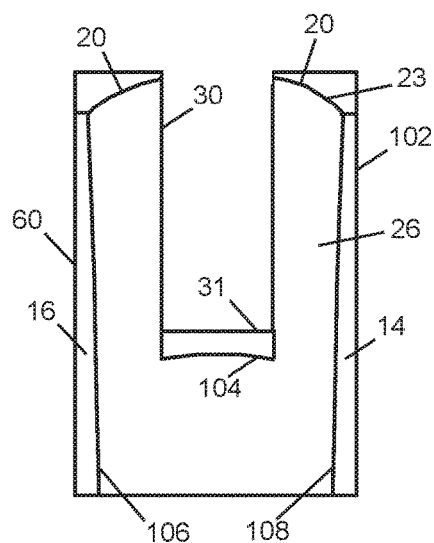
FIG. 6 is a sectional view from the back of the holder taken along section B-B of FIG. 5.

FIG. 5 shows the right side 60 of the holder, extending from front, right edge 36 to back, right edge 62. Section B-B defines the view in FIG. 6, which shows the left wall 14, the right wall 16, the top aperture 20, the inner surface 26 of the guiding funnel, the right surface 60, the left surface 102 and the notch 30. The front edge 31 of the bottom of the notch 30 is straight, while the inner bottom edge 104 of the notch is curved, due to the curvature of the guiding funnel 23. The line 106 in an up-down direction on the inner surface 26 of the guiding funnel 23 is slightly convex, as is the line 108 on the inside of the left wall 14.

Figure 7:
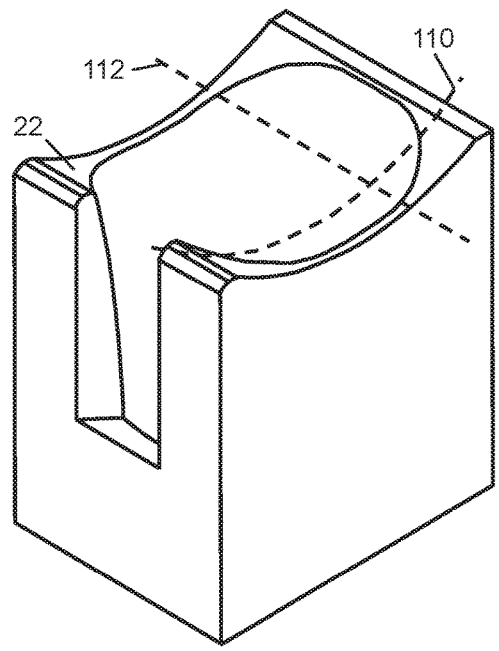
FIG. 7 is a perspective view of the holder of FIG. 1 showing orthogonal profiles of the top surface.

FIG. 7 shows the circularly cylindrical nature of the top surface 22. Profiles of the top surface 22 are shown in two orthogonal directions. Dotted line 110 shows the profile of the top surface 22 when viewed from the side of the holder. When viewed from the side, the top surface 22 is concave, i.e. the top surface has a concave side profile corresponding to a portion of a right circular cylinder. Dotted line 112 shows the profile of the top surface 22 when viewed from the front or back of the holder, and it can be seen that the profile is linear. From front to back of the holder, the top surface first curves downwards and then upwards. In other embodiments the top surface may be parabolically cylindrical, elliptically cylindrical, hyperbolically cylindrical or otherwise cylindrical in form. Similarly to the inner surface 26 of the guiding funnel 23, the top surface 22 does not have any portion that is concave in two orthogonal directions, i.e. it does not have dimples, closed-end troughs or basin-like areas in which water can puddle if the holder is placed in a dishwasher without thought to its orientation. In fact, all the surfaces have at least one linear or convex sectional profile and there are no pockets anywhere in the holder, so that dishwashing water drains off the holder in every orientation.

C. Variations

Figure 8:
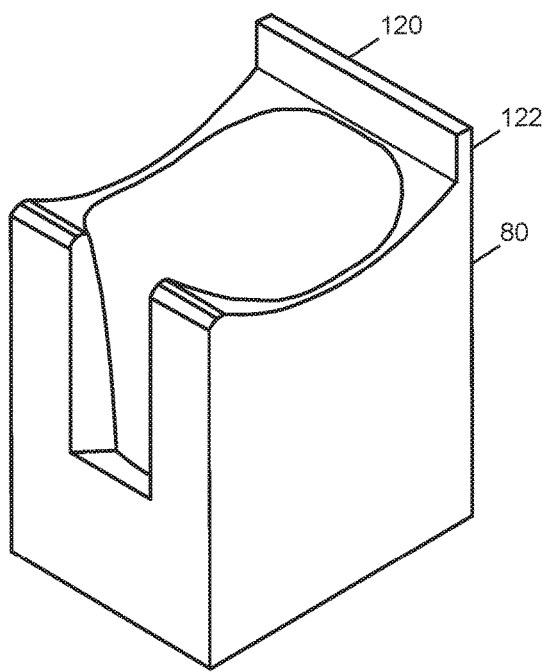
FIG. 8 is a perspective view of a holder with a back plate, according to another embodiment of the present invention.

FIG. 8 shows another embodiment of the holder with a back plate 120, which extends upwards from a rear portion of the top surface. The back plate 120 has an outer or back surface 122, which is flush with the back surface 80 of the holder. The purpose of the back plate is to improve the capture and guidance of the containers, and/or to provide additional support to the containers that are placed in an inverted position in the holder.

Figure 9:
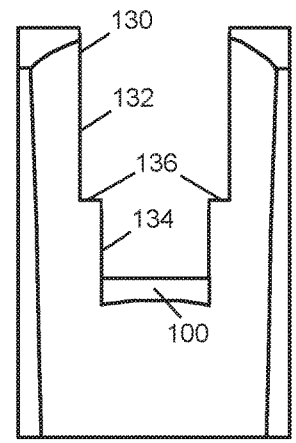
FIG. 9 is a sectional view from the back of a holder with a stepped notch, according to another embodiment of the present invention.

FIG. 9 shows another embodiment of the holder in which the notch 130 is stepped. The upper portion 132 of the notch is wider than the lower portion 134 of the notch. A step 136 is present on each side, between the two portions of the notch. The step can be used for supporting a handle, when present, on bottles placed in the holder, whereas the bottom 100 of the notch can be used for supporting narrower handles present on other bottles that are placed in the holder. The profile of the stepped notch, including the width and height of the portions can be different in other embodiments, and the step may be other than horizontal.

Figure 10:
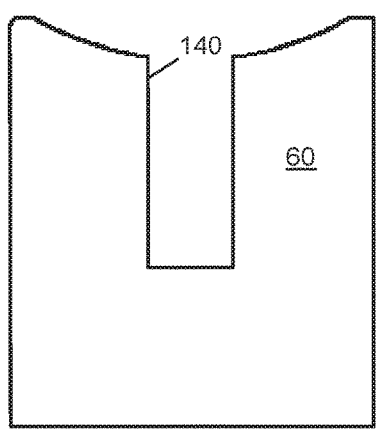
FIG. 10 is a side view of a holder with side notches, according to another embodiment of the present invention.

FIG. 10 shows another embodiment of the holder providing a view of the right side 60 with two side notches 140 located in the middle of the side walls 14, 16. These side notches can be used to accommodate the twin handles that are found on some bottles. In other embodiments, there may just be one side notch, for accommodating a single handle on bottles that are of a different size to the ones that would have their handles supported in the front notch 30.

Figure 11:
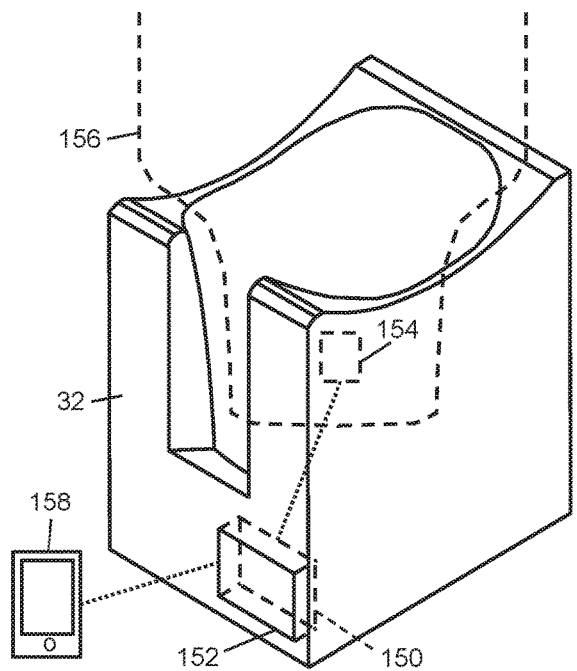
FIG. 11 is a perspective view of a holder with an electronic communication device, according to another embodiment of the present invention (not to scale).

FIG. 11 shows another embodiment of the holder with a recess 150 in the front surface 32, in which is located a wireless electronic device 152, which may be a Bluetooth™ communication enabled device, for example, that has a unique identification that is associated with the holder. The device 152 is configured to detect and read an electronic tag 154, such as an RFID (radio frequency identification) tag, on a container 156 that is positioned in the holder. The electronic tag 154 may include a UPC (Universal Product Code) or alternate identifier of the product in the container 156. The device 152 is also configured to communicate with an external electronic device 158, such as a smartphone (not to scale). In use, the smartphone 158 can run an application that can inform the user of the smartphone how long since the particular container 156 was first used in the holder, when a new product should be bought and/or when the shelf life of the product in the container has expired.

In other embodiments, the electronic device 152 may simply be an RFID tag. In this case, the external electronic device 158 is configured to read an identification that is passively transmitted from such tag, and pair it with an identification that is transmitted from the tag on the container.

In other embodiments the communication device 152 may not be initially provided, and instead replaced with a plug that can be removed. This allows the user of the holder to upgrade to one that is communicatively enabled by purchasing only the electronic device 152. In still other embodiments, the electronic device 152 may communicate with a smart fridge. Alternately, or additionally, when a container is placed in the holder 10, the tag 154 on the container can be read by the electronic device 152 and automatically transmitted to a grocery list, for example on the external electronic device 158 or a smart fridge. When a container is first placed in the holder 10, this is indicative of the product in the container getting low, since there will be no need to place a full container or one with a still significant amount of product in the holder. When the amount of product is low, then it is more useful to purchase a new container, rather than after the product has all been used or when there is still a significant amount of product in the container. Automatic timers can be employed so as to not re-add the product to the grocery list until a predetermined or learned period of time has expired, or if the product is already listed and has not yet been removed.

Figure 12:
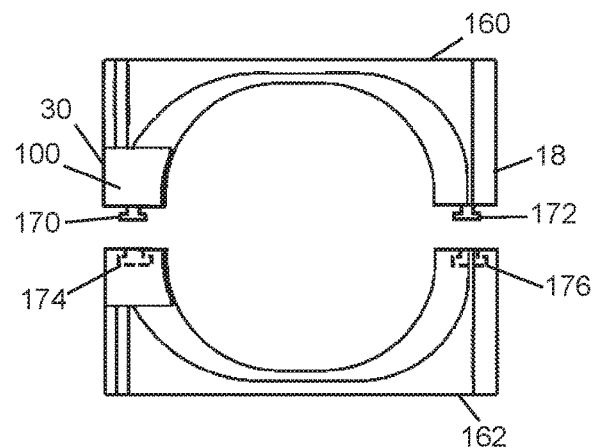
FIG. 12 is a top view of a holder that is manufactured in two parts, according to another embodiment of the present invention.

Referring to FIG. 12, in another embodiment the holder can be manufactured in two portions 160 and 162. This allows for the saving of considerable space during distribution if the components are packed and shipped without being joined together. The left half 160 has a T-section projection 170 extending for at least a portion of the available height below the bottom surface 100 of the notch 30. The left half 160 also has a T-section projection extending for at least a portion of the available height of the back wall 18. The T-section projections 170, 172 slide to engage with corresponding slots 174, 176 in the right hand portion 162 of the holder. In other embodiments, the connectors may be different.

Figure 13:
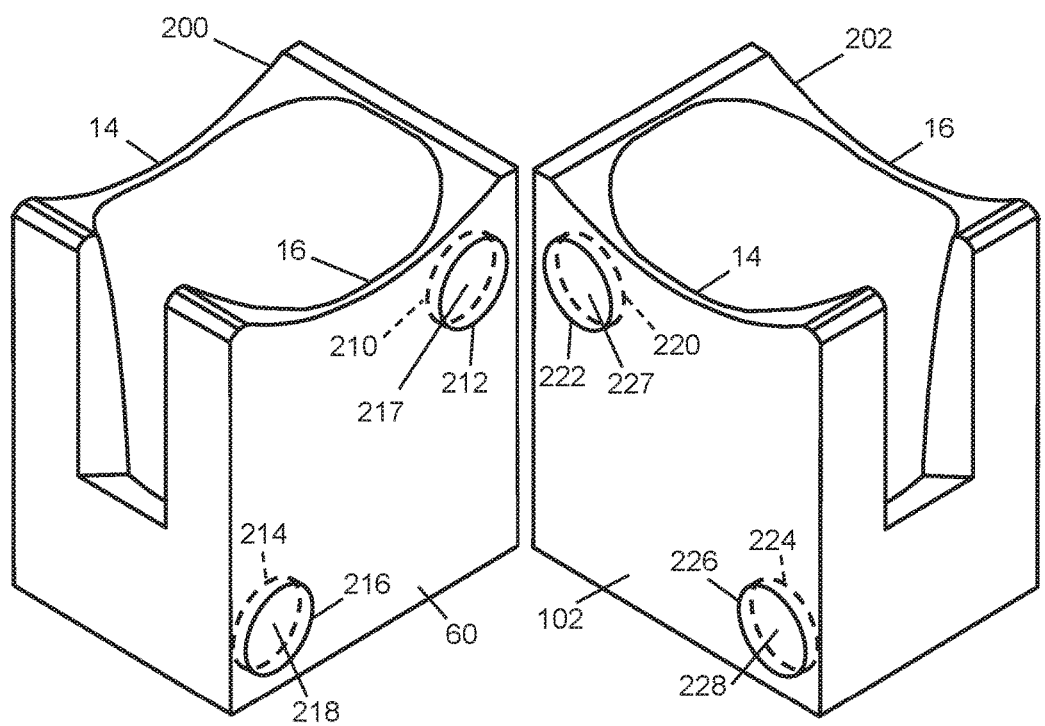
FIG. 13 is a perspective view of two holders fitted with magnetic connectors, according to another embodiment of the present invention.

Referring to FIG. 13, in another embodiment two holders 200, 202 are shown that connect together. The left holder 200 has, in its right hand face 60, an upper recess 210 in which a magnet 212 is located and a lower recess 214 in which a further magnet 216 is located. The outer surfaces 217, 218 of the magnets are flush with the right hand surface 60 of the holder 200. The right holder 202 has, in its left face 102, an upper recess 220 in which a magnetic material 222 is located and a lower recess 224 in which a further piece of magnetic material 226 is located. The outer surfaces 227, 228 of the magnet material are flush with the left hand surface 102 of the holder 202. The magnets 212, 216 align with the complementary pucks of magnetic material 222, 226 respectively when the holders 200, 202 are placed side by side, resulting in the holders being held together sufficiently strongly to be carried as a unit.

In some embodiments, the left hand wall 14 of the left holder 200 may include pucks of magnetic material, like the left hand wall 14 of holder 202. Similarly, the right hand wall 16 of the right holder 202 may include magnets, like the right hand wall 16 of holder 200. As such more than two holders can be temporarily connected together and carried as a unit.

Magnets may be used exclusively instead of a combination of magnets and magnetic material, provided that the polarities are suitably oriented. Other connecting means may instead be used, such as mechanical interlocks or Velcro™.

D. Further Variations

While edges of the holder have been shown to be angular or rounded in different locations, each edge can either be angular or rounded depending on the specific embodiment chosen. In particular, all edges and corners may be radiused to prevent accidental scratching of the user.

Surfaces that are flat and/or vertical are to be understood as such within normal engineering and manufacturing tolerances. The may also be understood to remain flat and/or vertical even if they are embossed or debossed with decorative features such as a logo. While the exemplary embodiments have vertical outer surfaces, other embodiments may be used that have outer sides that are off-vertical by up to 2° that would allow for a suitable draft when injection molding.

The curvature or flatness of all the surfaces of the holder may be varied, so long as no surfaces include dimples, closed-end troughs or basin-like areas in which water may remain puddled after a dishwashing cycle.

The holder can be made from molded plastic, for example by injection molding or by 3D printing. The plastic may be food-safe, washable and/or dishwasher safe. It may, for example, be free from bisphenol and stable up to temperatures of 170° F. It may be made from recyclable plastic. The density of the plastic should be high enough to provide adequate stability to the holder when resting on a level surface. The plastic may be solid throughout the holder. The holder may be dimensioned to fit inside the door of a refrigerator, or it may be of a smaller or larger size.

Sides of the holder have been named as front, left, right and back, but they may be named differently depending on the orientation the holder is to be viewed, without changing any of the features of the holder.

As a specific example, the holder may be dimensioned to fit in a shelf of a typical fridge door. In this case, the width of the holder may be 63 mm, the height 92 mm, and the depth 83 mm. The notch may be 25 mm wide and its front lower edge 37 mm above the bottom of the holder. The notch may be 64 mm deep at its bottom back edge. The radius of cylindrical curvature of the top surface may be 72 mm. The top aperture may measure 67 mm by 57 mm with radiused corners of 29 mm at the front and 22 mm at the back. The bottom aperture may measure 55 mm by 50 mm, with all corners radiused at 24 mm. The radius of curvature of the top surface may be 72 mm.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. All parameters, dimensions, materials, and configurations described herein are examples only and actual values of such depend on the specific embodiment. Accordingly, the scope of the invention is to be construed in accordance with the substance defined by the following claims.

The invention claimed is:

1. A holder for an inverted container comprising:
   a holder body being comprised of
      a front wall having a notch extending partially down the front wall from a middle region of a top edge of the front wall,
      two opposing side walls each connected at front edges thereof to a different side edge of the front wall,
      a back wall connected at different side edges thereof to back edges of the two side walls,
      a top surface formed by tops of the front, back and side walls, the top surface having a first aperture and a concave side profile extending from front wall to back wall and being concave in only one orthogonal direction, and
      a bottom surface formed by bottoms of the front, back and side walls and having a second aperture that is smaller than the first aperture; and
   a funnel inside the front, back and side walls being defined by an inner surface in the holder body connecting the first aperture to the second aperture, the inner surface having a convex profile that extends from the first aperture to the second aperture.

2. The holder of claim 1, wherein the top surface is cylindrical.

3. The holder of claim 1, wherein the convex profile extends from all points on the first aperture to the second aperture.

4. The holder of claim 1, wherein the notch has a base that slopes inward and down towards the funnel.

5. The holder of claim 1, wherein the front, back and side walls have outer surfaces that are vertical.

6. The holder of claim 1, wherein the notch is a stepped notch that has an upper region and a lower region that is narrower than the upper region.

7. The holder of claim 1, wherein the holder body further comprises a back plate that extends upwards from a rear portion of the top surface.

8. The holder of claim 1, wherein the holder body further comprises, in one or both sidewalls, a notch extending partially down the sidewall from a middle region of the top of the sidewall.

9. The holder of claim 1, further comprising the holder body in two portions that have been joined together.

10. The holder of claim 1, further comprising an electronic device that is configured to read a radio frequency identification tag on a container that is fitted into the funnel of the holder body.

11. The holder of claim 1, further comprising a recess in the holder body and a removable plug in the recess, the recess configured to accommodate an electronic device that is configured to read a radio frequency identification tag on a container that is fitted into the funnel of the holder body.

12. The holder of claim 1, further comprising one or both of a magnet and a magnetic material positioned to magnetically connect the holder body to a further holder body having one or both of a complementary magnet and complementary magnetic material.

13. The holder of claim 1, wherein all surfaces of the holder body, whether individually or combined, are pocketless such that water drains off the holder body when the holder is washed in a dishwasher.

14. The holder of claim 1, wherein said holder body is made from dishwasher-safe material.

15. The holder of claim 1, wherein said holder body is made from bisphenol-free plastic.

16. The holder of claim 1, wherein said holder body is made from recyclable plastic.

17. The holder of claim 1, wherein all outer edges and corners of said holder body are radiused.

18. The holder of claim 1, wherein the front, back and side walls have outer surfaces that are vertical to within 2°.

19. The holder of claim 1, wherein said holder body is solid.

\* \* \* \* \*